(12) United States Patent
Calloway et al.

(10) Patent No.: US 6,363,589 B1
(45) Date of Patent: Apr. 2, 2002

(54) RESCUE HOOK WITH SAFETY LOCKING MECHANISM

(75) Inventors: Charles H. Calloway, Christiansburg, VA (US); John D. Marcaccio, Mt. Airy, NC (US)

(73) Assignee: Aerial Machine & Tool Corporation, Veste, WA (US)

( * ) Notice: Subject to any disclaimer, the term of this patent is extended or adjusted under 35 U.S.C. 154(b) by 0 days.

(21) Appl. No.: 09/679,278

(22) Filed: Oct. 4, 2000

(51) Int. Cl.[7] ............................................... F16B 45/02
(52) U.S. Cl. .................... 24/600.1; 24/600.1; 24/599.1; 24/599.5
(58) Field of Search ............................ 24/599.1, 599.2, 24/599.4, 599.5, 599.9, 600.1, 600.2; 294/82.19, 82.2; 59/84, 86; 403/79, 315

(56) References Cited

U.S. PATENT DOCUMENTS

| | | | | |
|---|---|---|---|---|
| 939,727 A | * | 11/1909 | Maki ......................... 24/600.2 |
| 1,347,369 A | * | 7/1920 | Hamrick ................. 24/600.2 X |
| 1,521,811 A | * | 1/1925 | Hartbauer .............. 24/600.1 X |
| 1,667,957 A | | 5/1928 | Stevenson |
| 2,706,318 A | | 4/1955 | Coffing |
| 2,872,717 A | * | 2/1959 | Kelley ................... 24/599.1 X |
| 3,194,598 A | | 7/1965 | Goldfuss |
| 3,940,173 A | * | 2/1976 | Ulbing ................. 24/600.2 X |
| 4,320,561 A | | 3/1982 | Müller et al. |
| 4,440,432 A | * | 4/1984 | Goris ..................... 24/599.8 X |
| 4,492,386 A | * | 1/1985 | Roberts ................. 24/600.1 X |
| 4,528,729 A | | 7/1985 | Schmidt et al. |
| 4,539,732 A | | 9/1985 | Wolner |
| 4,977,647 A | | 12/1990 | Casebolt |
| 5,257,441 A | * | 11/1993 | Barlow ....................... 24/599.5 |
| 5,463,798 A | * | 11/1995 | Wurzer ....................... 24/599.5 |
| 5,577,304 A | * | 11/1996 | Simond ...................... 24/599.5 |
| D389,983 S | | 1/1998 | Maness |
| 5,735,025 A | | 4/1998 | Bailey |
| 5,896,630 A | | 4/1999 | Smith et al. |

OTHER PUBLICATIONS 10 pages from Lifesaving Systems Corp. catalog.
11 printouts of Lifesaving Systems Corp. web. pages.

* cited by examiner

*Primary Examiner*—Anthony Knight
*Assistant Examiner*—Ruth C. Rodriguez
(74) *Attorney, Agent, or Firm*—Banner & Witcoff Ltd.

(57) ABSTRACT

This invention relates to a rescue hook assembly that utilizes a spring-loaded gate across the opening into the hook and has an improved safety locking mechanism to prevent accidental opening of the gate. The locking mechanism works independently from the gate, thus allowing the gate itself to be opened and closed multiple times while the locking mechanism is disengaged. With the locking mechanism engaged, however, the gate is kept in its closed position. The locking mechanism can be operated with one hand and color-coded indicators let the operator know if the mechanism is in the locked or unlocked position.

13 Claims, 5 Drawing Sheets

RESCUE HOOK WITH SAFETY LOCKING MECHANISM

BACKGROUND OF THE INVENTION

The present invention relates to a load-carrying rescue hook assembly intended to function at the end of a cable or rope, which is raised by a hoisting apparatus. The hook carries a load, which is typically attached to the hook in the form of a sling or similar attachment strap.

Known hook assemblies of this type comprise a hook member designed to carry a sling or similar load-bearing attachment strap. The sling or attachment strap is engaged to or disengaged from the load-bearing portion of the hook through a gap provided between one side of the hook and an opposed tip portion of the hook. For safety, a gate or latch of some type typically bridges this gap. In most cases, this gate is pivotally attached to the side of the hook opposite its tip and is spring loaded in such a manner that the gate is biased into the closed position to prevent accidental disengagement of the sling or strap.

Known hook assemblies of the above-mentioned type have considerable disadvantages. For instance, the spring used in the spring-loaded gate has a finite size constraint due to the dimensions of the hook and gate. This size constraint, in turn, limits the maximum allowable spring rate. At times when this type of hook is lifting a load, the load may oscillate a considerable amount. Though rare, these oscillations may cause the portion of the sling or attachment strap that is inside the hook to come into contact with the gate, overcome the spring force of the gate, and cause an accidental disengagement of the load in what is commonly referred to as "roll-out". In addition, if the gate is snagged by anything during use and the spring force is overcome, the gate can open. Thus, there is a potential for either an accidental disengagement of the load or accidental engagement of whatever snagged the gate.

To address the disadvantages caused by an accidental gate opening, some hooks employ a mechanism that locks the gate into the closed position in conjunction with spring-loaded retention. Operation of these gates usually involves a two-step operation, where the first step is to unlock a locking mechanism and the second step is to open the spring-loaded gate. When the gate is allowed to return to the closed position, the locking mechanism is automatically engaged and the process must be repeated in order to open the gate again.

Known hook assemblies that incorporate a locking mechanism are often difficult and cumbersome to operate. Because the operator of a rescue hook will often be wearing gloves, and because the hook may be used in adverse conditions such as cold weather, at night, in water, or a combination of the three, a two-step locking mechanism operation has proven to be difficult and can cost valuable time during a rescue operation. In addition, this operation must be repeated each time the gate needs to be opened, thereby increasing the number of times this difficulty must be overcome. Moreover, the locking mechanism of known hook assembles often requires a level of manual or digital dexterity that an operator may not possess when his or her hands are cold.

It is an object of this invention to provide a rescue hook assembly that utilizes a spring-loaded gate in conjunction with a locking safety mechanism to prevent accidental gate opening.

It is another object of this invention to provide such a locking safety mechanism that can be toggled from the "locked" to "unlocked" position or vice versa easily and with one motion, and that will remain in the "locked" or "unlocked" position as long as may be desired.

It is a further object of this invention to provide a locking safety mechanism that can be operated without requiring a high level of digital dexterity.

In particular, this invention provides a locking safety mechanism that operates separately from the spring-loaded gate, thus allowing the gate to be opened and closed numerous times while the locking mechanism is in the "unlocked" position, while not allowing the gate to open while the locking mechanism is in the "locked" position.

Further objects and advantages of the invention are set forth below or are apparent to those skilled in the art.

SUMMARY OF THE INVENTION

With these objectives in mind, the present invention provides a rescue hook assembly with a safety locking mechanism. The rescue hook is suited for, inter alia, helicopter search and rescue (SAR) operations. The rescue hook is comprised of a hook body having a curved, inner load-bearing surface at its lower portion and an attachment stem at its upper portion for attachment to a cable or rope of a hoisting apparatus.

An opening or gap into the curved, load-bearing surface is defined by a space between the hook's tip end and the hook body opposite the hook tip. This gap allows the introduction of items into the load-bearing section of the hook body.

A spring-loaded gate is pivotally attached to the hook body and bridges the gap, and is biased by a spring towards the hook tip, thereby keeping the gap closed. The gate can be opened by applying pressure on the gate towards the hook body, and the gate will return to the closed position when the pressure is removed (e.g., when a load or sling is "snapped" into the hook). In order to keep the gate in the closed position when unwanted pressure might attempt to open the gate, this invention incorporates a safety mechanism. A sliding latch mechanism saddles the edge of the hook body and is located in such a way that it prevents the gate from opening when in a locking position.

The latch has two distinct positions: locked and unlocked. Each position is defined by the mating of the spring-loaded ball of a ball-detent plunger with an indentation on the inside face of the latch. When the indentation of the latch is mated with the ball-detent that corresponds to the locked position, the latch prevents the gate from opening even when pressure is applied to the gate. By applying pressure to the latch and sliding it, the latch moves away from the locked position until the indentation is mated with the ball-detent corresponding to the unlocked position. The gate is then allowed to freely open and close until the operator moves the latch back to the locked position.

Red and green pins made from fiber optic material or other suitable plastic are located in the hook body in such a manner that when the latch is in the locked position, the green pin is visible and the red is not. Likewise, when the latch is in the unlocked position, the red pin is visible and the green is not. The combination of the latch mechanism that can be easily moved between the locked and unlocked position along with color-coded indicators makes this rescue hook easy to operate with very little training.

BRIEF DESCRIPTION OF THE DRAWINGS

The attached drawings form a part of this specification, and reference numbers used in the drawings correspond to reference numbers contained in the written description.

DETAILED DESCRIPTION OF THE PREFERRED EMBODIMENT

Figure 1:
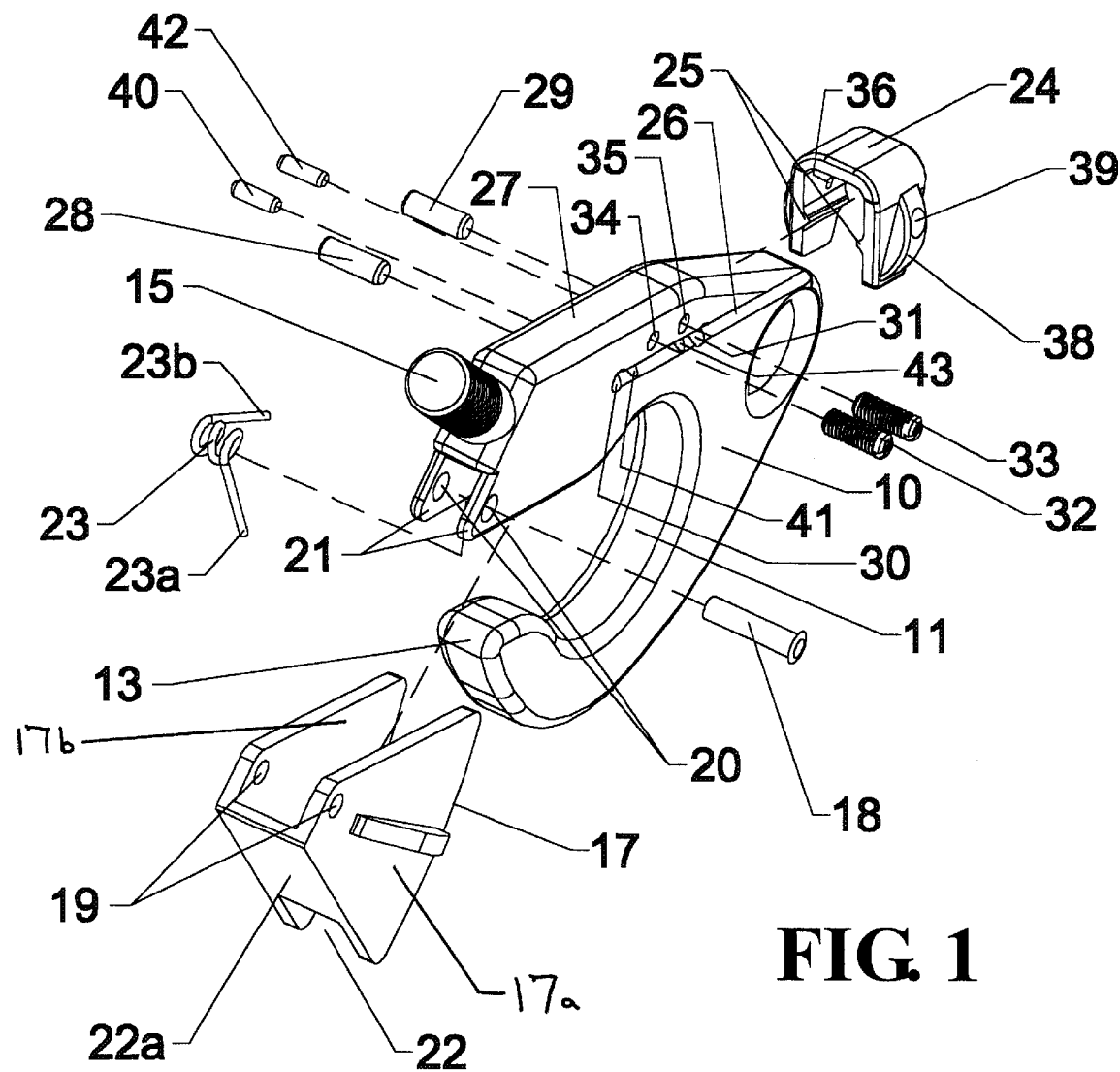
FIG. 1 is an isometric, exploded view of a preferred embodiment of the Rescue Hook of the invention.

The Rescue Hook has a hook body 10 with a curved, lower inside edge 11 and an opening (hereafter referred to as gap) 12 between the hook tip 13 and the upper inside edge 14 of said hook body. A threaded attachment stem 15 is located at the top of said hook body 10 and serves as an attachment to mate with a hoisting apparatus, connecting swivel or other connecting device. The particular means by which the Rescue Hook is mated with a line connecting it to a hoist is not part of the invention, however. As persons skilled in the art will recognize, other attachment methods would also be possible. A multi-purpose hole 16 located at the bottom of the hook can serve as an attachment location for an accessory or safety line.

Gap 12 is bridged by a triangular-shaped gate 17, which gate is pivotally attached to said hook body 10 by means of a rivet style fastener 18 or similar fastening device. As shown in FIG. 1, gate 17 comprises two essentially triangular plates 17a and 17b which are joined on one side by side 22a. Fastener 18 passes through holes 19 bored through two opposing sides 17a and 17b of gate 17 at its upper end and also passes through holes 20 bored through two ears 21 that extend from hook body 10. A cut-out 22 in the lower portion of the side 22a of gate 17 allows gate 17 to cover a portion of hook tip 13. The upper edge of cut-out 22 (i.e., the lower edge of side 22a) makes contact with hook tip 13 and serves to limit the rotation of gate 17 away from hook body 10.

Figure 2:
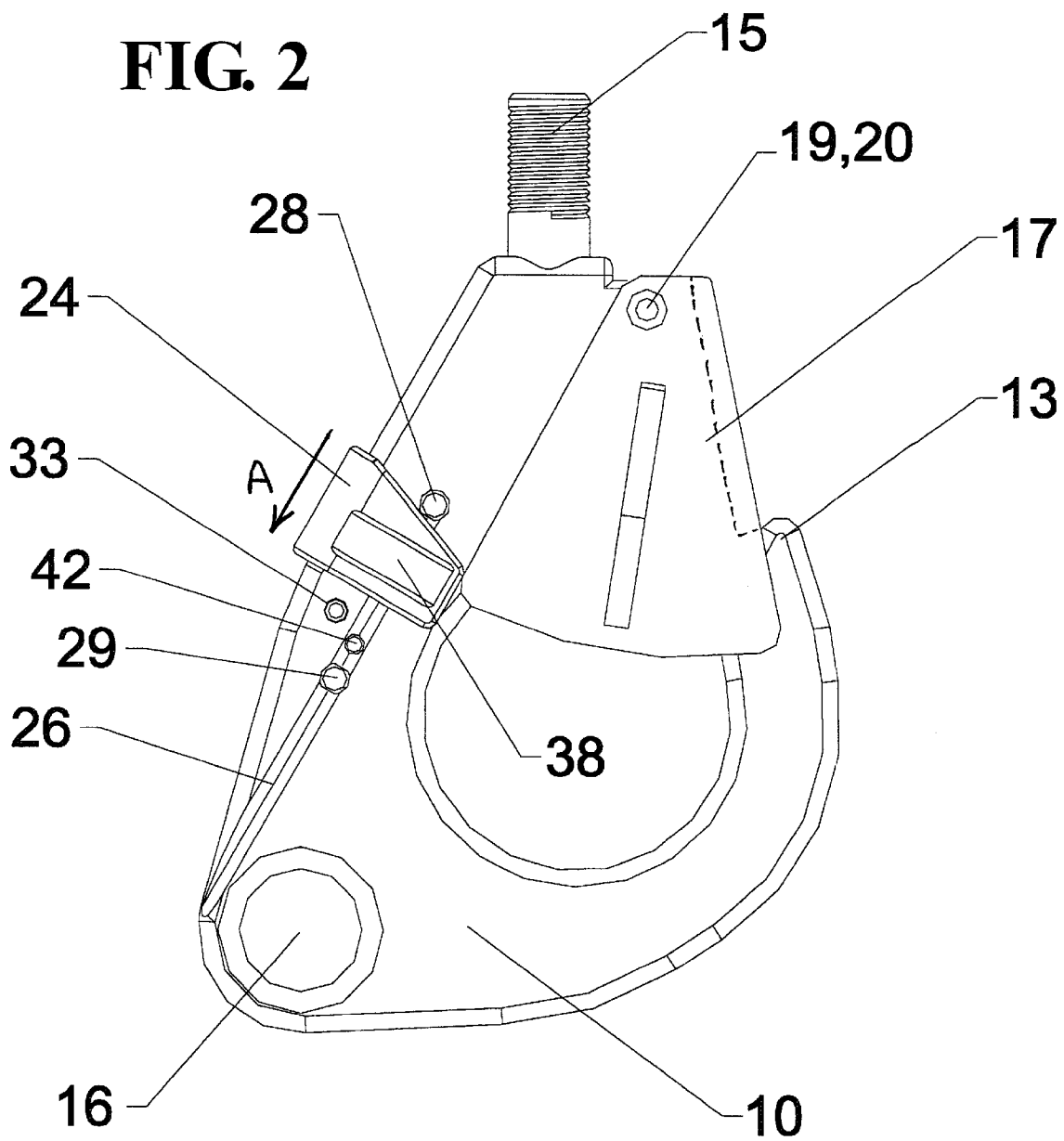
FIG. 2 is a front view of a preferred embodiment of the Rescue Hook with the gate closed and the latch in the locked position.
Figure 3:
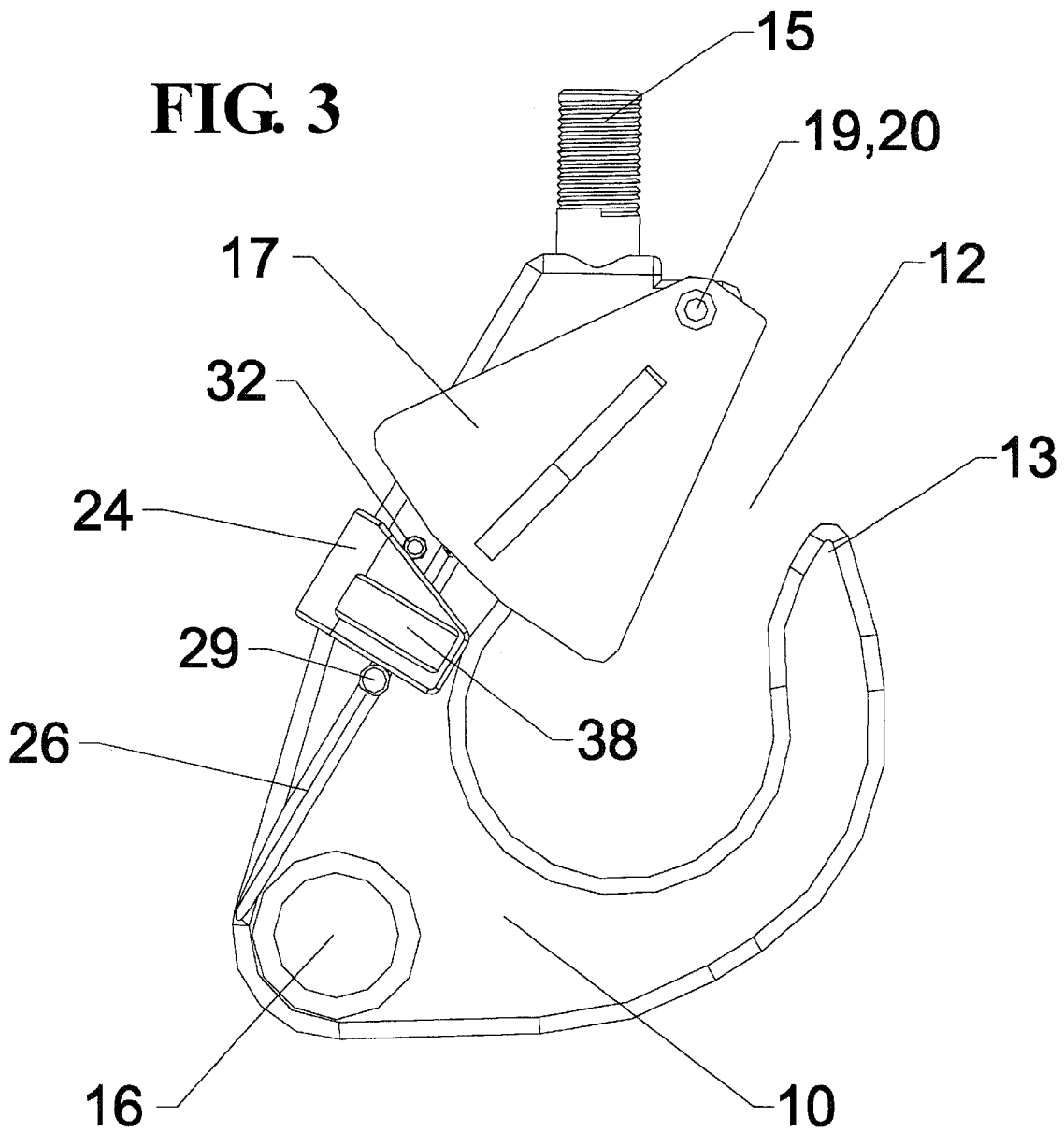
FIG. 3 is a front view of a preferred embodiment of the Rescue Hook with the latch in the unlocked position and the gate open.

A torsion spring 23 is located between ears 21 and serves to bias gate 17 toward hook tip 13. When the Rescue Hook is assembled, torsion spring 23 rests between ears 21; fastener 18 passes through the coil portion of torsion spring 23. One distal end 23a of torsion spring 23 rests against the inside face of side 22a of gate 17, while the other distal end 23b of torsion spring 23 rests against the portion of hook body 10 between ears 21. Gate 17 has two operating positions: closed and open. In the closed position (as shown in FIG. 2 with side 22a shown with hidden lines), the upper edge of cut-out 22 is held against hook tip 13 by the force of torsion spring 23. In the open position (as shown in FIG. 3), gate 17 is rotated toward the main portion of hook body 10.

In order to maintain gate 17 in the closed position when so desired, this invention incorporates a safety locking mechanism in the form of a latch 24. Said latch 24 is in the form of a saddle that is slidably attached to said hook body 10 by means of two protruding rails 25 on the opposing inside faces of latch 24. Rails 25 mate with two grooves 26, which grooves are cut into opposing sides of hook body 10 and are parallel with the upper outside edge 27 of hook body 10.

The amount by which latch 24 may travel along grooves 26 is limited by an upper stop-pin 28 and a lower stop-pin 29. Upper stop-pin 28 is placed through a hole 30 bored through hook body 10 at the upper end of grooves 26. Lower stop-pin 29 is placed through a hole 31 bored through hook body 10 at a point along grooves 26 approximately 1.25 inches below the centerline of upper stop-pin 28. The ends of stop pins 28 and 29 are flush with the sides of hook body 10, but form obstructions within grooves 26 that restrict the extent to which latch 24 may slide in said grooves.

Figure 5:
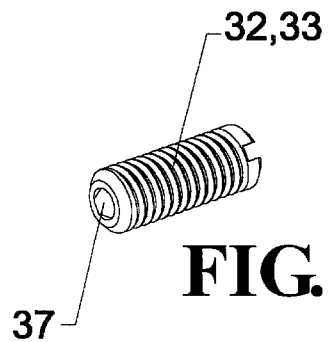
FIG. 5 is an isometric view of a ball-detent plunger (3× scale of FIG. 4).
Figure 6:
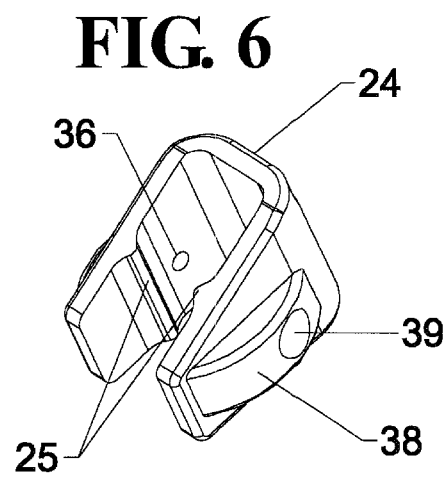
FIG. 6 is an isometric view of a latch (2× scale of FIG. 4).

Within its range of sliding motion, latch 24 is held in two distinct positions with the aid of a threaded, upper ball-detent plunger 32 and a threaded, lower ball-detent plunger 33. Such pre-formed ball-detent plungers are well known in the art. Such ball-detent plungers, an outer view of which is shown in FIG. 5, generally comprise a threaded outer body portion encasing a spring and ball, with the ball biased by the spring through an opening in one end of the ball-detent plunger. Such a ball-detent plunger is available from McMaster-Carr Supply Company, part no. 340A95. Upper ball-detent plunger 32 is threaded into a tapped hole 34 bored through hook body 10 in an area between grooves 26 and upper outside edge 27 of hook body 10. In a similar manner, lower ball-detent plunger 33 is threaded into a tapped hole 35 bored through said hook body 10 approximately 0.45 inches below the centerline of upper ball-detent plunger hole 34 in a direction parallel to grooves 26.

Figure 3A:
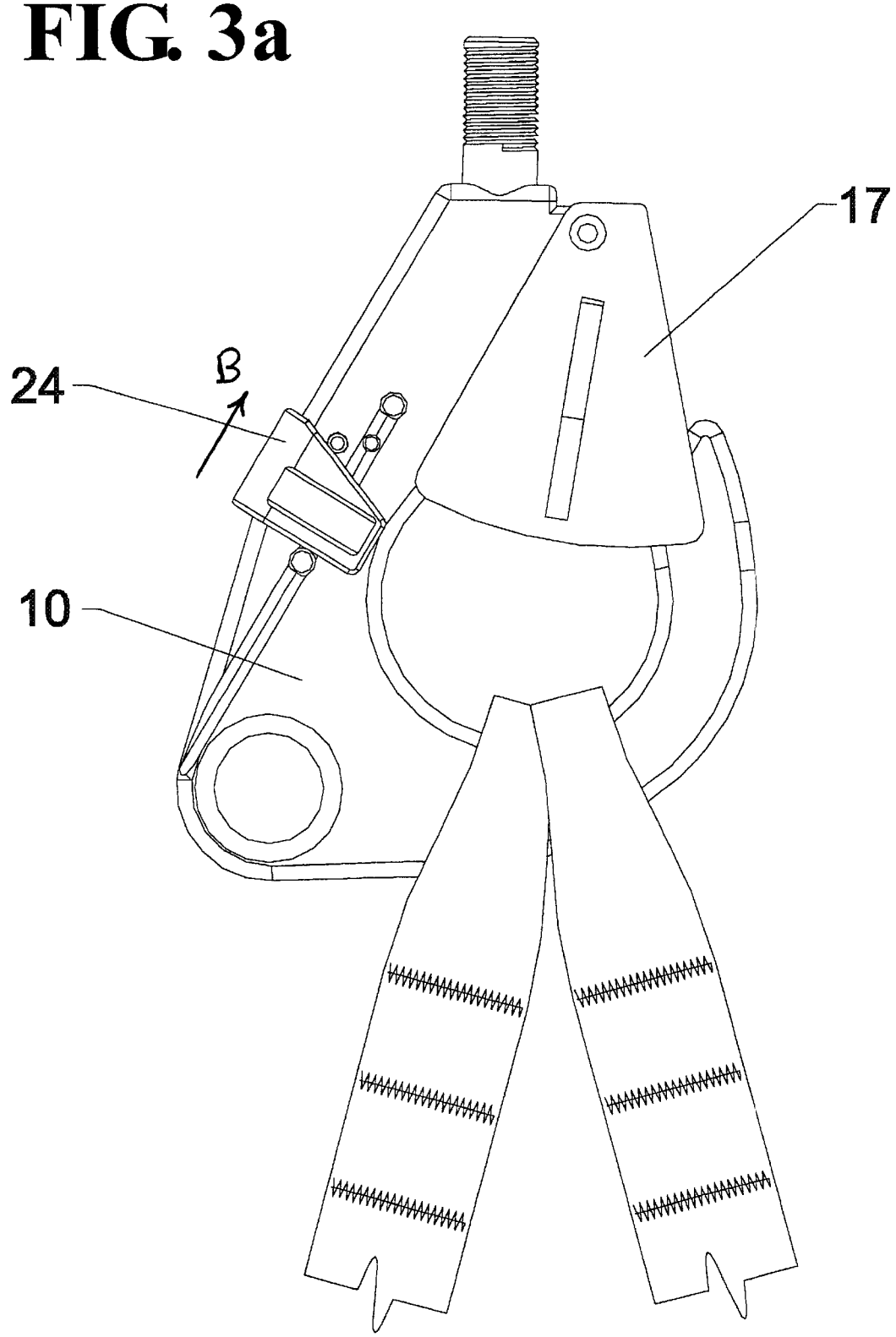
FIG. 3a is a front view of a preferred embodiment of the Rescue Hook with the latch in the unlocked position, the gate closed, and showing a load sling in place.
Figure 4:
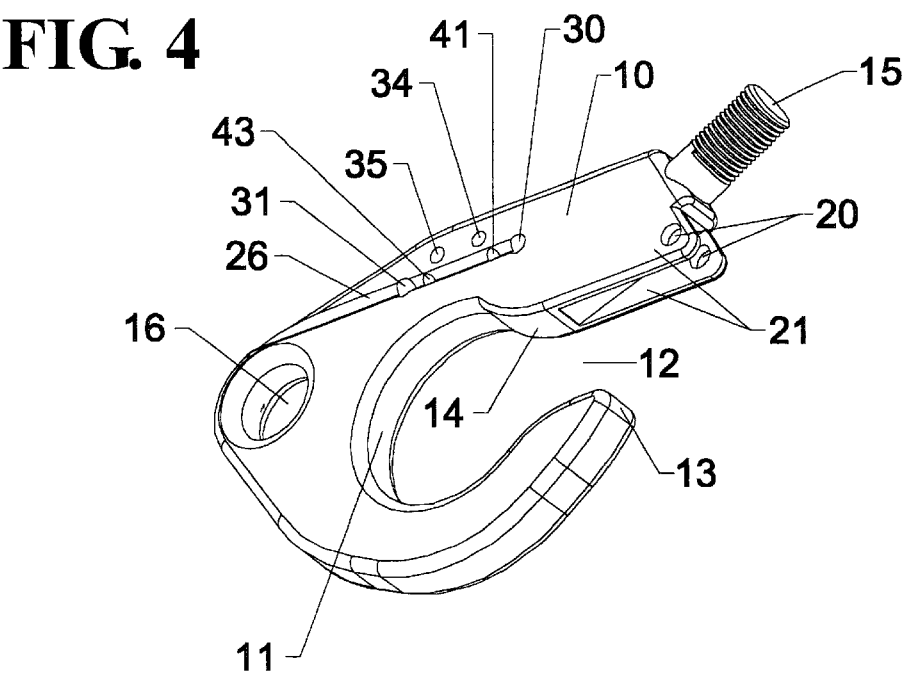
FIG. 4 is an isometric view of the body of a preferred embodiment of the Rescue Hook.

A small indentation 36 on the inside face of said latch 24 is designed to mate with the spring-loaded ball 37 of ball-detent plungers 32 and 33. When indentation 36 is mated with said spring-loaded ball 37 of upper ball-detent plunger 32, latch 24 is in the locked position (as shown in FIG. 2). In this position, the lower edges of latch 24 prevent gate 17 from rotating to the open position. When indentation 36 is mated with the spring-loaded ball 37 of lower ball-detent plunger 33, latch 24 is in the unlocked position (as shown in FIG. 3). In this position, gate 17 is free to rotate between the open and closed positions. The spring-loaded force of the balls 37 of ball-detent plungers 32 and 33 serve to retain latch 24 in the locked and unlocked positions, respectively. Said spring forces can be overcome, however, by exerting a moderate sliding force on latch 24 in directions A (FIG. 2) and B (FIG. 3a). Ease of moving latch 24 from the locked position to the unlocked position and vice versa is enhanced by the addition of grippers 38 formed into the sides of latch 24. The configuration of a sliding latch allows an operator to lock or unlock the Rescue Hook, even if the operator's fingers are cold and/or numb, by moving latch 24 with the palm of the hand.

Indentation 36 on the inside face of latch 24 can be created by boring a hole 39 through the opposite side of latch 24 and then using the tip of the drill to create indentation 36 in a procedure commonly referred to as "spot facing". Hole 39 also allows access to ball-detent plungers 32 and 33. This access allows the tension of the ball-detent plungers 32 and 33 to be adjusted while mated with indentation 36.

Persons skilled in the art will recognize that numerous alternative means may be employed to retain latch 24 in its locked and unlocked positions, the use of ball-detent plungers being merely the preferred embodiment. By way of example only, a spring-loaded cam-type follower could be adapted to an inside portion of latch 24 and configured to rest in depressions formed on body 10.

To facilitate ease of use by less skilled operators, this invention further includes colored pins made from fiber-optic material, plastic or other suitable material, and that indicate whether latch 24 is in the locked or unlocked position. Preferably, a red pin 40 is placed through a hole 41 bored through hook body 10 inside said grooves 26 just below upper stop pin 28. When latch 24 is in the unlocked position, red pin 40 is visible, indicating this position as unsafe. A green pin 42 is placed through a hole 43 bored through hook body 10 inside grooves 26 just above lower stop pin 29. When latch 24 is in the locked position, green pin 42 is visible, indicating this position as safe. The ends of both pins 40 and 42 are flush with the bottoms of grooves 26, thereby not interfering with the motion of latch 24.

Hook body 10, gate 17 and latch 24 can be made from any material or materials that will provide the strength and corrosion-resistance properties needed for a particular application. Possible materials include 15-5PH or 17-4PH stainless steel.

The foregoing description is of a preferred embodiment of the Rescue Hook, and is intended to instruct those skilled in the art how to make and use the invention. Such persons will appreciate, however, that there are many possible variations and modifications to the above-described embodiment of the invention. The invention is not limited by the preferred embodiment, but instead includes all modifications, variations and equivalents, and is limited only by the attached claims, which claims are to be given the widest scope consistent with the principles disclosed and as may be allowed by the prior art.

We claim:

1. A rescue hook, comprising:
   a main body portion;
   an arcuate extension from said main body portion terminating in a tip and forming a recess, said recess being accessible through a gap formed between said tip and said main body portion;
   a gate attached to said main body portion and operable to open and close said gap, said gate operable to open said gap by movement of a load through said gap; and
   a latch slidably attached to said main body portion, said latch sliding between a first and a second position and capable of remaining in either said first or said second position without imposition of external force,
      wherein said latch, when in said first position, interferes with said gate so as to prevent said gate from opening said gap,
      wherein said latch, when in said second position, does not interfere with said gate opening said gap,
      wherein said gate is biased to close said gap, and
      wherein said latch is retained in said first or second position through the use of a ball-detent plunger corresponding to each of said first and second positions.

2. A rescue hook, comprising:
   a main body portion;
   an arcuate extension from said main body portion terminating in a tip and forming a recess, said recess being accessible through a gap formed between said tip and said main body portion;
   a gate attached to said main body portion and operable to open and close said gap, said gate operable to open said gap by movement of a load through said gap; and
   a latch slidably attached to said main body portion, said latch sliding between a first and a second position and capable of remaining in either said first or said second position without imposition of external force,
      wherein said latch, when in said first position, interferes with said gate so as to prevent said gate from opening said gap,
      wherein said latch, when in said second position, does not interfere with said gate opening said gap, and
      wherein said main body portion has at least one color-coded insert, said insert being alternatively obscured and revealed as said latch is moved between said first and second positions.

3. The rescue hook of claim 2, wherein said gate is biased to close said gap.

4. The rescue hook of claim 3, wherein said latch is retained in said first or second position through the use of a ball-detent plunger corresponding to each of said first and second positions.

5. The rescue hook of claim 3, wherein said latch is adapted to slide along an outside edge of said main body portion.

6. The rescue hook of claim 5, where said latch has at least one external protrusion to facilitate gripping and moving said latch.

7. A rescue hook, comprising:
   a body having an arcuate recess formed therein, said recess having a mouth through which a load may be engaged by said recess;
   a gate attached to said body and adapted to open and close said mouth; and
   a latch attached to said body and having a first and a second position, said latch being biased to remain in either said first or said second position without imposition of external force, and being movable between said first and second positions through imposition of external force,
      wherein said latch, when in said first position, prevents said gate from opening said mouth,
      wherein said latch, when in said second position, allows said gate to open said mouth,
      wherein said gate is biased to close said mouth, and
      wherein said latch is retained in said first or second position through the use of a ball-detent plunger corresponding to each of said first and second positions.

8. The rescue hook of claim 7, wherein said latch is adapted to slide along an outside edge of said body.

9. A rescue hook, comprising:
   a body having an arcuate recess formed therein, said recess having a mouth through which a load may be engaged by said recess;
   a gate attached to said body and adapted to open and close said mouth; and
   a latch attached to said body and having a first and a second position, said latch being biased to remain in either said first or said second position without imposition of external force, and being movable between said first and second positions through imposition of external force,
      wherein said latch, when in said first position, prevents said gate from opening said mouth, wherein said latch, when in said second position, allows said gate to open said mouth, and wherein said body has at least one color-coded insert, said insert being alternatively obscured and revealed as said latch is moved between said first and second positions.

10. The rescue hook of claim 9, wherein said gate is biased to close said mouth.

11. The rescue hook of claim 10, wherein said latch is retained in said first or second position through the use of a ball-detent plunger corresponding to each of said first and second positions.

12. The rescue hook of claim 11, wherein said latch is adapted to slide along an outside edge of said body.

13. The rescue hook of claim 12, wherein said latch has at least one external protrusion to facilitate gripping and moving said latch.

* * * * *

UNITED STATES PATENT AND TRADEMARK OFFICE
CERTIFICATE OF CORRECTION

PATENT NO.   : 6,363,589 B1
DATED        : April 2, 2002
INVENTOR(S)  : Charles H. Calloway et al.

It is certified that error appears in the above-identified patent and that said Letters Patent is hereby corrected as shown below:

<u>Title page,</u>
Item [73], Assignee, "Veste, WA" has been replaced with -- Vesta, VA --.

Signed and Sealed this

Eighteenth Day of February, 2003

JAMES E. ROGAN
*Director of the United States Patent and Trademark Office*